United States Patent [19]

Ooura et al.

[11] Patent Number: 5,422,395
[45] Date of Patent: Jun. 6, 1995

[54] VINYL ACETYLSALICYLATE-VINYL ALCOHOL BASED COPOLYMER

[75] Inventors: Makoto Ooura, Hasakimachi; Yoshiro Onda, Higashikurume; Kiyokazu Imai, Okayama, all of Japan

[73] Assignee: Shin-Etsu Chemical Co., Ltd., Tokyo, Japan

[21] Appl. No.: 265,103

[22] Filed: Jun. 24, 1994

[30] Foreign Application Priority Data

Jun. 25, 1993 [JP] Japan .................. 5-179953

[51] Int. Cl.⁶ .............................. C08F 16/06
[52] U.S. Cl. .................... 525/60; 526/320; 526/322; 526/325; 526/313
[58] Field of Search ............ 525/60; 526/322, 325, 526/313, 320

[56] References Cited

U.S. PATENT DOCUMENTS 5,169,898 12/1992 Walls et al. .............. 525/60 X

Primary Examiner—Judy M. Reddick
Attorney, Agent, or Firm—Oblon, Spivak, McClelland, Maier, & Neustadt

[57] ABSTRACT

A vinyl acetylsalicylate-vinyl alcohol based copolymer which comprises a structural unit having the following formula (1):

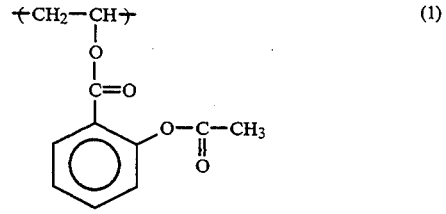

and a structural unit having the following formula (2):

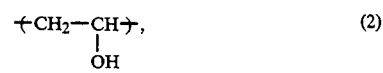

optionally with at least one member selected from the group consisting of a structural unit having the following formula (3):

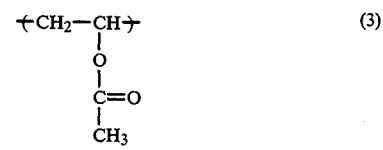

and a structural unit having the following formula (4):

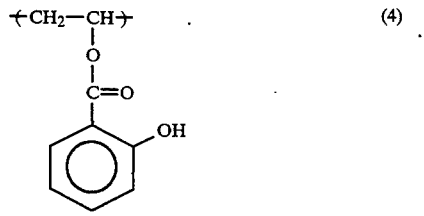

In the copolymer, the amounts of vinyl acetylsalicylate units and vinyl alcohol units, degree of polymerization and the like can be controlled, whereby the efficacy of acetylsalicylic acid can be easily controlled as desired. Therefore, the copolymer is expected to be widely applicable as medicament.

9 Claims, No Drawings

VINYL ACETYLSALICYLATE-VINYL ALCOHOL BASED COPOLYMER

BACKGROUND OF THE INVENTION

1. Field of the Invention

The present invention relates to a vinyl acetylsalicylate-vinyl alcohol based copolymer suitable for use as medicament and to a copolymeric precursor thereof.

2. Description of the Prior Art

Acetylsalicylic acid is widely used as a medicament, called aspirin, for producing antipyretic and analgesic medicines. There have been many investigations on acetylsalicylic acid, and it has recently been reported that acetylsalicylic acid has some newly found effects such as antithrombotic effect in addition to the antipyretic and analgesic effects.

For broadening the scope of application of acetylsalicylic acid as medicament, attempts have been made to control as desired or stabilize the efficacy of the acid. For instance, conversion of acetylsalicylic acid to its sodium salt, aluminum salt, etc., incorporation of acetylsalicylic acid in tablets, capsules, etc. and the like methods have been attempted for the purpose of controlling and stabilizing the efficacy of acetylsalicylic acid. These methods, however, are not yet satisfactory for enlarging the application area of acetylsalicylic acid as medicament.

As another means for broadening the scope of application of acetylsalicylic acid as medicament, a vinyl acetylsalicylate polymer obtained by polymerizing vinyl acetylsalicylate has been proposed. The polymer upon hydrolysis yields acetylsalicylic acid. The hydrolysis is regulated to control the amount of acetylsalicylic acid formed, thereby controlling the efficacy of the acid, or the way the effects of the acid are exerted.

A further attempt has been made in which the vinyl acetylsalicylate is regulated in degree of polymerization or saponification, whereby the amount of acetylsalicylic acid groups in the polymer can be varied, in order to control the efficacy of acetylsalicylic acid.

However, the vinyl acetylsalicylate polymer is a homopolymer and its saponification reaction proceeds with difficulty. Therefore, it is difficult to achieve the intended control of saponification degree of the polymer, namely, to accomplish a desired control of the efficacy of acetylsalicylic acid.

SUMMARY OF THE INVENTION

It is accordingly an object of the present invention to provide a new vinyl acetylsalicylate-vinyl alcohol based copolymer which ensures easy control of the efficacy of acetylsalicylic acid, and to a copolymeric precursor of said copolymer.

The present invention provides, as a means for attaining the above object, a vinyl acetylsalicylate-vinyl alcohol based copolymer which comprises a structural unit having the following formula (1):

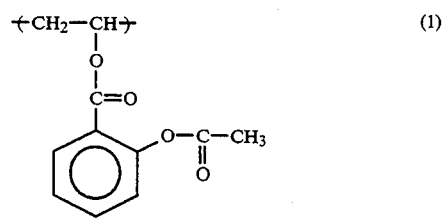

and a structural unit having the following formula (2):

optionally with at least one member selected from the group consisting of a structural unit having the following formula (3):

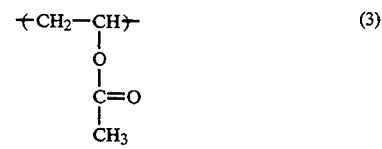

and a structural unit having the following formula (4):

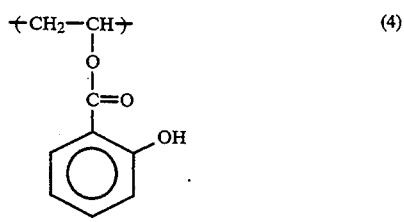

Also, the present invention provides a vinyl acetylsalicylate-vinyl acetate copolymer which comprises a structural unit having the above formula (1) and a structural unit having the above formula (3).

The vinyl acetylsalicylate-vinyl alcohol based copolymer according to the present invention is a new compound which has an efficacy of acetylsalicylic acid. In the vinyl acetylsalicylate-vinyl alcohol based copolymer, the amounts of vinyl acetylsalicylate units and vinyl alcohol units, degree of polymerization and the like can be controlled, whereby the efficacy of acetylsalicylic acid can be easily controlled as desired. Therefore, the vinyl acetylsalicylate-vinyl alcohol based copolymer is expected to be widely applicable as medicament. Besides, the vinyl acetylsalicylate-vinyl acetate copolymer according to the present invention is a new compound suited to use as a precursor of the vinyl acetylsalicylate-vinyl alcohol based copolymer varying in molecular composition and degree of polymerization.

DETAILED DESCRIPTION OF PREFERRED EMBODIMENTS

Vinyl acetylsalicylate-vinyl alcohol based copolymer

The degree of polymerization of the copolymer is not particularly limited. In order that the polymer can be easily handled or dealt with, however, the degree of polymerization preferably ranges from 100 to 3,000, more preferably from 300 to 2,000.

Based on all structural units contained in the copolymer, the amount of the structural unit of the formula (1) is preferably 1 to 30 mol %, more preferably 1 to 20 mol %. On the other hand, the structural unit of the formula (2) is present in an amount of 30 to 99 mol %, more preferably 70 to 99 mol %.

In addition, the amount of the structural unit of the formula (3) optionally contained in the copolymer is preferably not more than 40 mol %, more preferably not more than 10 mol %. The amount of the structural unit of the formula (4), which also is an optional component of the copolymer, is preferably not more than 10 mol %.

The copolymer is oleophilic where the structural units of the formulas (1), (3) and (4) are present in large amounts and the structural unit of the formula (2) in a very small (or excessively small) amount. Where the amount of the structural unit of the formula (2) is large, on the other hand, the copolymer is hydrophilic. Particularly, where the structural unit of the formula (2) is present in an amount of not less than 70 mol % based on all structural units contained in the copolymer, the copolymer is soluble in water and is therefore suited to use in antipyretic preparations or the like. On the other hand, where the amount of the structural unit of the formula (2) in the copolymer is smaller, the copolymer is insoluble in water but is yet applicable in preparing medicine for stupe, ointment or the like.

Where the amount of the structural unit of the formula (4) is too large, the copolymer exhibits a reduced efficacy of acetylsalicylic acid (though salicylic acid can also provide an analgesic effect or the like) and it is difficult to control the efficacy finely.

When the vinyl acetylsalicylate-vinyl alcohol based copolymer is put to use as a medicament, for example, it may be incorporated as an effective component in a medicine for stupe, ointment, etc. or be converted into the form of a powder or aqueous solution which is mixed with other effective components to constitute an antipyretic or the like.

Copolymeric precursor

The vinyl acetylsalicylate-vinyl alcohol based copolymer can be obtained by saponifying a vinyl acetylsalicylate-vinyl acetate copolymer containing the structural unit of the above formula (1) and the structural unit of the above formula (3).

The present invention also provides the vinyl acetylsalicylate-vinyl acetate copolymer (hereinafter referred to as the "copolymeric precursor") which can be used effectively as a precursor of the vinyl acetylsalicylate-vinyl alcohol based copolymer.

There are no restrictions on degree of polymerization of the copolymeric precursor. In order for the copolymeric precursor to be handled-or dealt with easily, however, the degree of polymerization preferably ranges from 100 to 3,000, more preferably from 500 to 2,500. Normally, the degree of polymerization of the copolymeric precursor may be selected so that the resulting vinyl acetylsalicylate-vinyl alcohol based copolymer have a desired degree of polymerization.

Based on all structural units contained in the copolymeric precursor, the amount of the structural unit of the formula (1) preferably ranges from 1 to 50 mol %, more preferably from 1 to 25 mol %. Where the amount of the structural unit of formula (1) is too small, the vinyl acetylsalicylate-vinyl alcohol based copolymer obtained through saponification cannot have a satisfactory efficacy of acetylsalicylic acid. Where the amount is too large, on the other hand, the resulting vinyl acetylsalicylate-vinyl alcohol based copolymer has poor solubility in solvents such as methanol and the like. On the other hand, the amount of the structural unit of the formula (3) preferably ranges from 50 to 99 mol %.

Saponification of the copolymeric precursor may be carried out, for example, by using an alkaline compound such as sodium hydroxide, potassium hydroxide and the like. The saponification causes a part of the structural unit of formula (1) and a part or the whole of the structural unit of formula (3) to form a structural unit having the formula (2). A part of the structural unit of formula (1) may form, through saponification of the acetyl group in its acetylsalicylic acid group, a structural unit having a salicylic acid group represented by the formula (4). However, this causes no inconveniences because salicylic acid has analgesic and other effects, like acetylsalicylic acid.

Besides, the degree of saponification can be easily controlled by varying the amounts of the alkaline compound and the copolymeric precursor as well as duration time of saponification. The amount of the alkaline compound can be suitably determined depending on the saponification degree of the vinyl acetylsalicylate-vinyl alcohol based copolymer desired. Specifically, the amount of the alkaline compound is preferably 3 to 20 milliequivalents, more preferably 5 to 15 milliequivalents, for the sum of acetate groups and acetylsalicylate groups. If the amount of the alkaline compound is too small, the saponification reaction proceeds with difficulty. If the amount is too large, it is difficult to control the reaction, and the amount of sodium acetate or the like by-produced is increased. The duration of saponification is not particularly limited, but it is preferably 10 to 120 minutes, more preferably 20 to 60 minutes. If the reaction time is too short, it is difficult to control the reaction. The saponification is carried out preferably at a temperature of 0° to 60° C., more preferably 20° to 50° C. By regulating the degree of saponification in this manner, it is possible to control the relative amounts of the structural units which constitute the resulting vinyl acetylsalicylate-vinyl alcohol based copolymer.

The saponification is preferably carried out in methanol or in a mixed solvent of benzene and methanol (with the weight ratio of methanol to benzene ranging, for example, from 1:1 to 1:9), in view of easier control of degree of saponification.

As described above, the copolymeric precursor has the advantage that the relative amounts of the structures of general formulas (1) to (4) incorporated in the resulting vinyl acetylsalicylate-vinyl alcohol based copolymer can be controlled over broad ranges by regulating the degree of saponification of the precursor. Specifically, the amount of the acetylsalicylic acid group in the copolymeric precursor can be set at any desired value, so that the resulting vinyl acetylsalicylate-vinyl alcohol based copolymer can be formed to have a desirably controlled efficacy of acetylsalicylic acid.

The copolymeric precursor can be easily produced by subjecting a mixture of vinyl acetylsalicylate and vinyl acetate to polymerization in the presence of a radical polymerization initiator according to known methods of polymerization such as bulk polymerization, solution polymerization, pearl polymerization or emulsion polymerization. In view of suitability to industrial production, preferred is a solution polymerization process in which polymerization is conducted in an organic solvent such as alcohols, e.g. as methanol, ethanol or isopropyl alcohol; benzene; and so forth.

The amounts of vinyl acetylsalicylate and vinyl acetate subjected to polymerization and the ratio of the amounts are not particularly restricted, and can be determined suitably depending on the desired degree of polymerization and composition of the vinyl acetylsalicylate-vinyl alcohol copolymer. Specifically, it is preferable to use 1 to 50 mol % of vinyl acetylsalicylate with 50 to 99 mol % of vinyl acetate, more preferably 1 to 25 mol % of vinyl acetylsalicylate with 75 to 99 mol % of vinyl acetate. Furthermore, the polymerization can be carried out by a suitably selected one of known types of polymerization, such as batch polymerization, semi-continuous polymerization, continuous polymerization and like.

There are no particular restrictions on the radical polymerization initiator used for copolymerization of vinyl acetylsalicylate with vinyl acetate. The applicable radical polymerization initiators which are known include, for example, azo compounds such as 2,2'-azobisisobutyronitrile, peroxides such as benzoyl peroxide, peroxycarbonates, and so forth. Among these, preferred are the azo compounds. Normally, the polymerization initiator may be used in an amount of 0.01 to 1.0% by weight, preferably 0.05 to 1.0% by weight, based on the vinyl acetylsalicylate monomer.

The temperature at which to carry out the polymerization may be suitably selected according to the kind of the radical polymerization initiator. Normally, the polymerization temperature is selected in the range of 30° to 90° C., preferably 50° to 80° C. The polymerization time varies depending on the degree of polymerization of the polymer to be obtained, and is normally 1 to 10 hours, preferably 2 to 7 hours.

As an atmosphere in which to carry out the polymerization, may be used an inert gas such as nitrogen and the like.

After the polymerization reaction is over, the reaction mixture may be put, for example, into petroleum ether, water or the like. For efficient removal of unreacted monomers, it is particularly preferable to put the reaction mixture into a poor solvent such as petroleum ether or the like, causing the polymer separate out, and collect the polymer. The polymer thus separated and collected may be washed again with the poor solvent or may be dissolved in a solvent such as benzene, acetone, methanol, etc. followed by putting the solution into the poor solvent, and the polymer separated out in the poor solvent is collected, whereby a purified copolymeric precursor can be obtained.

EXAMPLES

The present invention will now be described more in detail below with reference to examples, which are by no means limitative of the present invention.

Example 1

A 300-ml separable flask equipped with a stirrer, thermometer, nitrogen inlet and condenser was charged with 50 g of vinyl acetylsalicylate, 100 g of vinyl acetate and 100 g of methanol. After air in the flask was replaced with nitrogen, 0.45 g of 2,2'-azobisisobutyronitrile was added to the flask and polymerization reaction was allowed to proceed at 65° C. for 5 hours under a stream of nitrogen gas flowing at a rate of 50 ml/min.

The resulting reaction mixture in a pasty form was then added dropwise to petroleum ether, causing the produced polymer to separate out, and the polymer was collected. A process of dissolving the collected polymer in benzene, adding the resulting solution dropwise to petroleum ether and collecting the polymer separated out, was repeated to separate and purify the polymer.

Of the reaction mixture upon the polymerization, a 3 g portion was taken and its mass was measured accurately. The portion was treated to separate and purify the polymer in the same manner as above-described. The polymer obtained was dissolved in benzene, and the resulting solution was subjected to freeze drying over one day and night. The polymer thus obtained was weighed. From the weights of the vinyl acetylsalicylate and vinyl acetate charged and the weight of the freeze-dried polymer, the yield of the polymer was calculated to be 45.5%.

The polymer obtained was analyzed by $^1$H-NMR to determine the amounts of the vinyl acetylsalicylate component and the vinyl acetate component in the polymer. The analytical results showed that the polymer consists of 24.9 mol % of vinyl acetylsalicylate component and 75.1 mol % of vinyl acetate component.

The degree of polymerization of the polymer obtained was determined according to the viscosity measuring method specified in JIS K 6726, in which a polyvinyl acetylsalicylate is saponified completely and viscosity of the resulting polyvinyl alcohol is measured. The degree of polymerization was 1,300.

Example 2

A 300-ml separable flask equipped with a stirrer, thermometer, nitrogen inlet and condenser was charged with 10 g of vinyl acetylsalicylate, 90 g of vinyl acetate and 100 g of methanol. After air in the flask was replaced with nitrogen, 0.3 g of 2,2'-azobisisobutyronitrile was added to the flask and polymerization reaction was allowed to proceed at 65° C. for 5 hours under a stream of nitrogen gas flowing at a rate of 50 ml/min.

Out of the resulting reaction mixture in a pasty form, the polymer produced was separated and it was purified in the same manner as in Example 1.

Of the reaction mixture upon the polymerization, a 3 g portion was taken out and its mass was measured accurately, to determine the yield in the same manner as in Example 1. The yield was 52.3%.

The amounts of the vinyl acetylsalicylate component and the vinyl acetate component in the obtained polymer was measured in the same manner as in Example 1. The results showed that the polymer consists of 7.5 mol % of the vinyl acetylsalicylate component and 92.5 mol % of the vinyl acetate component.

The degree of polymerization of the polymer obtained was measured, in the same manner as in Example 1, to be 1,700.

Example 3

A 300-ml flask was charged with 150 ml of benzene and 15 ml of methanol. Into the resulting mixture, 3 g of the polymer obtained in Example 1 was added and dissolved. Thereafter, 30 ml of a 0.5N solution of NaOH in methanol was slowly added dropwise to the solution in the flask with stirring, to saponify the polymer for 1 hour.

The partially saponified polymer produced was washed with methanol, and vacuum dried at 120° C. over 3 hours.

The composition of the partially saponified polymer thus obtained was subjected to $^1$H-NMR spectral analysis. The analytical results showed that the produced polymer consists of 17.3 mol % of the structural units of the formula (1) or (4), 37.0 mol % of the structural unit of the formula (2), and 45.7 mol % of the structural units of the formula (3).

Example 4

A 1-liter flask was charged with 400 ml of methanol, into which 20 g of the polymer obtained in Example 2 was added and dissolved. To the resulting solution, 200 ml of a 0.5N solution of NaOH in methanol was slowly added dropwise with stirring, to saponify the polymer for 1 hour.

The partially saponified polymer produced was washed with methanol, and vacuum dried at 120° C. for 3 hours.

The composition of the partially saponified polymer thus obtained was subjected to $^1$H-NMR spectral analysis. The analytical results showed that the produced polymer consists of 4.1 mol % of the structural units of the formula (1) or (4), 9.84 mol % of the structural unit of the formula (2), and 86.1 mol % of the structural unit of the formula (3).

What is claimed is:

1. A vinyl acetylsalicylate-vinyl alcohol based copolymer which comprises a structural unit having the following formula (1):

  (1)

and a structural unit having the following formula (2):

  (2)

optionally with at least one member selected from the group consisting of a structural unit having the following formula (3):

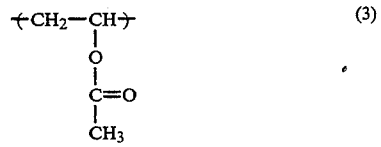  (3)

and a structural unit having the following formula (4):

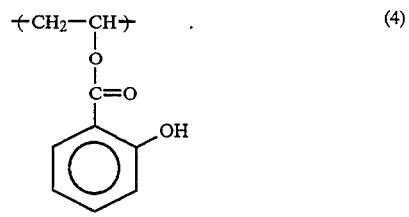  (4)

2. The vinyl acetylsalicylate-vinyl alcohol based copolymer of claim 1, having degree of polymerization of 100 to 3,000.

3. The vinyl acetylsalicylate-vinyl alcohol based copolymer of claim 1, wherein the amount of said structural unit having the formula (1) in said copolymer is 1 to 30 mol % based on all the structural units constituting the molecule.

4. The vinyl acetylsalicylate-vinyl alcohol based copolymer of claim 1, wherein the amount of said structural unit having the formula (2) in said copolymer is 30 to 99 mol % based on all the structural units constituting the molecule.

5. The vinyl acetylsalicylate-vinyl alcohol based copolymer of claim 1, wherein the amount of said structural unit having the formula (3) in said copolymer is not more than 40 mol % based on all the structural units constituting the molecule.

6. The vinyl acetylsalicylate-vinyl alcohol based copolymer of claim 1, wherein the amount of said structural unit having the formula (4) in said copolymer is not more than 10 mol % based on all the structural units constituting the molecule.

7. A vinyl acetylsalicylate-vinyl acetate copolymer which comprises a structural unit having the formula (1):

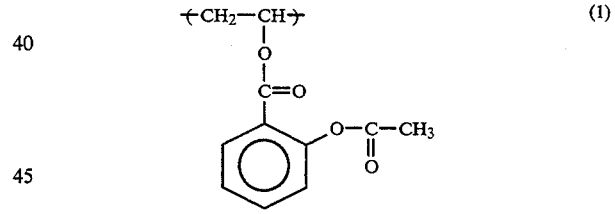  (1)

and a structural unit having the formula (3):

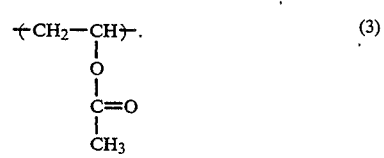  (3)

8. The vinyl acetylsalicylate-vinyl acetate copolymer of claim 7, having a degree of polymerization of 100 to 3,000.

9. The vinyl acetylsalicylate-vinyl acetate copolymer of claim 7, wherein the amount of said structural unit having the formula (1) in said copolymer is 1 to 50 mol % based on all the structural units constituting the molecule.

* * * * *